United States Patent
Eberhardt et al.

(10) Patent No.: US 6,899,135 B2
(45) Date of Patent: May 31, 2005

(54) MULTIWAY VALVE

(75) Inventors: Hans-Frieder Eberhardt, Giengen-Burgberg (DE); Rolf Kordon, Giengen (DE); Michael Neumann, Ulm (DE); Udo Wenning, Giengen/Brenz (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 10/873,478

(22) Filed: Jun. 21, 2004

(65) Prior Publication Data

US 2005/0000578 A1 Jan. 6, 2005

Related U.S. Application Data

(63) Continuation of application No. PCT/EP02/13879, filed on Dec. 6, 2002.

(30) Foreign Application Priority Data

Dec. 19, 2001 (DE) .......................................... 101 62 504

(51) Int. Cl.[7] .............................................. F16K 11/10
(52) U.S. Cl. .................................... 137/625.48; 60/509
(58) Field of Search ............................ 137/625.48, 885; 251/11; 60/509, 515

(56) References Cited

U.S. PATENT DOCUMENTS

| | | | |
|---|---|---|---|
| 3,989,058 A | * 11/1976 | Jackson et al. | ............. 137/269 |
| 4,114,645 A | 9/1978 | Pauliukonis | |
| 4,318,529 A | * 3/1982 | Huelle et al. | ................. 251/11 |
| 4,475,686 A | 10/1984 | Huelle et al. | |
| 4,535,821 A | * 8/1985 | Anderson | ................... 137/884 |
| 5,189,991 A | 3/1993 | Humburg | |

FOREIGN PATENT DOCUMENTS

| | | |
|---|---|---|
| DE | 1 041 314 | 10/1958 |
| DE | 38 13 727 A1 | 11/1988 |
| DE | 198 33 744 C1 | 11/1999 |

* cited by examiner

Primary Examiner—John Fox
(74) Attorney, Agent, or Firm—John T. Winburn; Russell W. Warnock; Craig J. Loest

(57) ABSTRACT

A housing of a multiway valve contains several inlets and outlets and a chamber containing several valve seats, each of which is allocated to one of the outlets. A closing device can be displaced between the valve seats. A cylinder contains a cylinder chamber having a fluid. A heating device is provided for heating the fluid and a plunger is provided that can be displaced in the cylinder by the pressure of the fluid. By its displacement, the plunger is able to dislodge the closing device from one of the valve seats.

15 Claims, 3 Drawing Sheets

MULTIWAY VALVE

CROSS-REFERENCE TO RELATED APPLICATION

This application is a continuation, under 35 U.S.C. § 120, of copending international application No. PCT/EP02/13879, filed Dec. 6, 2002, which designated the United States; this application also claims the priority, under 35 U.S.C. § 119, of German patent application No. 101 62 504.9, filed Dec. 19, 2001; the prior applications are herewith incorporated by reference in their entirety.

BACKGROUND OF THE INVENTION

Field of the Invention

The present invention relates to a multiway valve and to a fluid circuit and a refrigerator in which such a multiway valve can be used.

Multiway valves are used in refrigerators having more than one cooling space and mutually independent temperature regulations of the plurality of cooling spaces, in order to supply a refrigerant stream selectively in each case to the evaporator of that cooling space where it is required. Conventionally, multiway valves of this type are configured as solenoid valves, in which a closing member formed of a ferromagnetic material is changed over, as a result of the action of the magnetic field of an electromagnet, between two different rest positions, in which it blocks in each case one of two possible paths of the refrigerant through the valve. In order to achieve a good leaktightness of the solenoid valve in its various switching positions, the closing member, at rest, must not be pressed with too low a force against its seat; this force has to be overcome during the changeover of the valve, in order to bring the closing member into a new position. The higher the closing force is, the larger, the more powerful and correspondingly the more costly is the electromagnet required for this purpose.

SUMMARY OF THE INVENTION

It is accordingly an object of the invention to provide a multiway valve which overcomes the above-mentioned disadvantages of the prior art devices of this general type, in which the closing member can be changed over without the use of a magnetic force. A further object is to specify a multiway valve which can be manufactured cost-effectively in large quantities.

With the foregoing and other objects in view there is provided, in accordance with the invention, a multiway valve. The valve contains a housing having a plurality of inlets and outlets and a chamber. A plurality of valve seats is provided and each is associated with one of the inlets or outlets. A closing member is disposed in the housing and is movable between the valve seats. At least one cylinder having a fluid-containing cylinder chamber is provided and disposed in the housing. A heating device is provided for heating the cylinder. A plunger is movable in the cylinder under pressure of a fluid. The plunger, by virtue of its movement, is capable of displacing the closing member from one of the valve seats to another of the valve seats.

Instead of magnetic force, the solenoid valve utilizes the expansion of a heated fluid in the chamber, in order to drive a changeover movement of the closing member from one switching position of the valve to another.

Preferably, the cylinder chamber communicates temporarily with one of the inlets and outlets of the valve during the movement of the plunger. This makes it possible for the fluid switched by the multiway valve to be used as a working fluid in the cylinder chamber. It is therefore easy to ensure that there is always sufficient working fluid for driving the cylinder movement. An absolute leaktightness of the cylinder chamber for long periods of time, that is to say over a multiplicity of switching cycles, is not necessary for the operation of the valve, thus allowing the valve to be produced cost-effectively.

Preferably, each seat of the valve is assigned in each case to an outlet in the valve, so that the pressure of the fluid flowing through the valve can be utilized in order to press the closing member against its seat.

In order to allow a reliable changeover of the valve, even in the state where the fluid does not flow through the latter, there is expediently a spring-elastic element that exerts on the closing member a counter force that counteracts the displacement of the closing member from each seat. The spring-elastic element can ensure, furthermore, that, when the closing member has been displaced from one seat, it assumes a new closing position on another seat.

The closing member is movable in a housing chamber which is designated here as a seat chamber. The valve seats are preferably disposed on the first wall of the seat chamber, and the spring-elastic element acts upon the closing member in the direction of the first sidewall, so that the closing member assumes there a position on one of the seats. The spring-elastic element used for this purpose is preferably a leaf spring.

The cylinder is preferably in each case provided with a pressure compensation orifice that, in the extended state of the plunger, allows pressure compensation between the seat chamber and a cylinder chamber of the cylinder. When this pressure compensation takes place, the movement of the plunger ends.

The cylinder preferably has a rear wall which is displaceable under spring load which makes it possible to displace the plunger of one cylinder, which is driven in a movement by another cylinder, at least in an initial phase of the movement, solely counter to the spring force and without the compression of the fluid contained in the cylinder chamber.

A spring chamber on the outside of the movable rear wall, the spring chamber receiving the spring loading the rear wall, can communicate with the surroundings of the multiway valve, but preferably with the seat chamber itself, so that the volume of the spring chamber can be varied, as required.

Preferably, the valve configuration according to the invention is used in a multiway valve which has two seats and two cylinders located diametrically opposite one another; the invention may, however, also be applied to valves with a larger number of seats and cylinders.

A heating device for heating the fluid in the cylinder chamber is preferably disposed in the heating chamber that communicates with the cylinder chamber, but is offset from the latter, in order to protect the heating device from the movements of the cylinder.

The multiway valve according to the invention can be used for gaseous, liquid or partly gaseous and partly liquid fluid streams. When the fluid entering the multiway valve is a liquid or a gas/liquid mixture, a supply circuit for supplying the electrical heating device with heating energy is expediently configured with high enough power such that it is capable of at least partially evaporating the fluid used in the cylinder chamber.

Other features which are considered as characteristic for the invention are set forth in the appended claims.

Although the invention is illustrated and described herein as embodied in a multiway valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
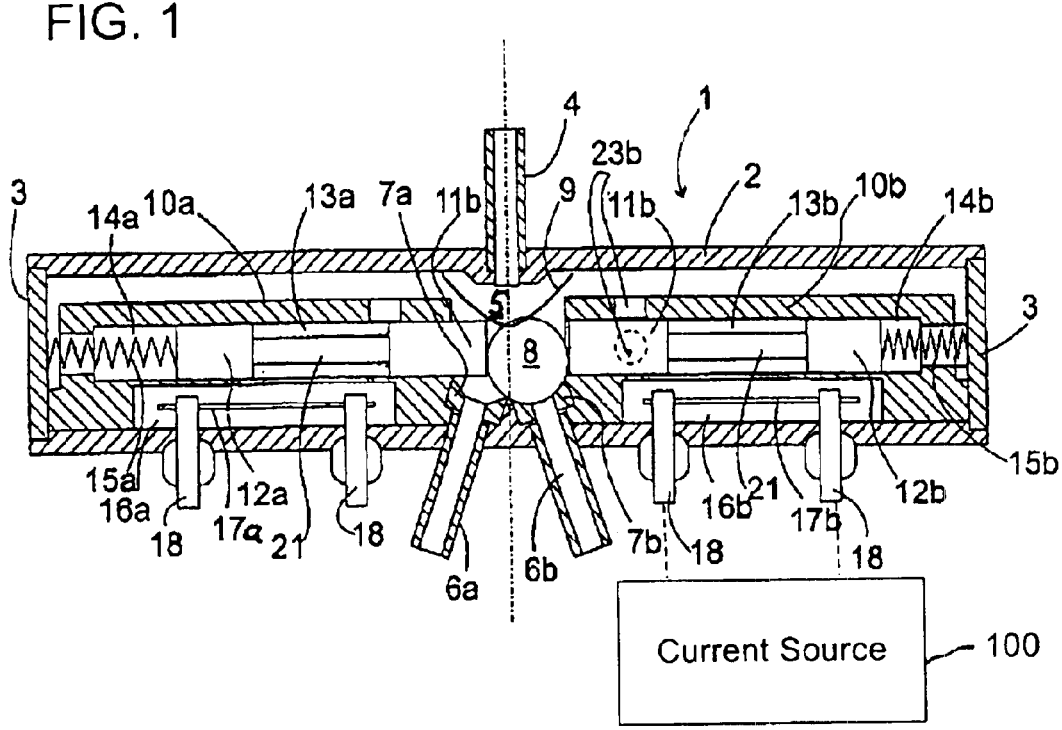
FIGS. 1 to 4 are diagrammatic, longitudinal sectional views through a multiway valve according to a first embodiment of the invention in four different phases of operation.

Referring now to the figures of the drawing in detail and first, particularly, to FIG. 1 thereof, there is shown a longitudinal sectional view of a multiway valve according to a first embodiment of the invention in a stable rest state. The valve has a housing 1 in the form of a tubular piece 2 which is closed in a leaktight manner at its two ends by small inserted, for example, soldered plates 3.

The tubular piece 2 has three bores that issue in each case into a central chamber, designated as a seat chamber 5, of the housing 1. An inlet line 4 for a fluid is inserted into a first bore on a plane of symmetry, illustrated as a dash-and-dot line, of the housing 1, and an outlet line 6a and 6b with a hollow-conical valve seat 7a and 7b is inserted in each case into two bores on a diametrically opposite side of the housing 1. The outlet lines 6a, 6b run toward one another in the direction of the housing 1, so that the valve seats 7a, 7b are virtually contiguous to one another inside the housing 1. A closing member in the form of a ball 8 on the right-hand seat 7b shuts off the right-hand outlet line 6b. Opposite to two valve seats 7a, 7b, on the same side as the inlet line 4, is a leaf spring 9 which is symmetrical with respect to the mid-plane and, in the state shown in FIG. 1, presses the ball 8 against the valve seat 7b and thus keeps the right-hand outlet line 6b closed.

Two cylinders 10a, 10b are accommodated in the housing 1 on the right and on the left of the seat chamber 5. In a bore of each of the cylinders 10a, 10b, a plunger 11a and 11b and a displaceable rear wall 12a and 12b delimit a cylinder chamber 13a, 13b. The cylinder bodies in each case have formed in them, in each case outside the displaceable rear walls, 12a, 12b, a spring chamber 14a, 14b which accommodates a helical spring 15a and 15b which in each case presses the displaceable wall 12a and 12b away from the small plate 3 of the housing and toward the middle of the valve. The plungers 11a, 11b in each case carry, on their side directed outward toward the cylinder chamber 13a and 13b, a bar 21 which, in the state shown in FIG. 1, touches the displaceable rear wall 12a and 12b. The spring force exerted by the helical springs 15a, 15b is thus transmitted to the ball 8 via the displaceable rear walls 12a, 12b and the plungers 11a, 11b. The forces of the springs 15a, 15b are oriented opposite to one another and largely compensate one another. None of the springs 15a, 15b is capable of overcoming the force exerted on the ball 8 by the leaf spring 9, which keeps the ball pressed against its seat, and of displacing the ball 8 from its seat 6b.

A heating chamber 16a, 16b in which an ohmic resistor 17a, 17b is located as a heating element, is provided next to the cylinder chamber 13a, 13b and, communicating with the latter, on both sides of the housing 1. Current leadthroughs 18 for a selective supply of current to the resistor 17a or 17b are led through the tubular piece 2. FIG. 1 shows two current leadthroughs 18 for each heating resistor 17a and 17b. It is also possible to provide in each case, for each heating resistor, only one leadthrough 18 which is insulated relative to the housing 1 and which is connected to one end of its resistance wire. The other end of both resistance wires can be grounded via the metallic tubular piece 2.

Figure 2:
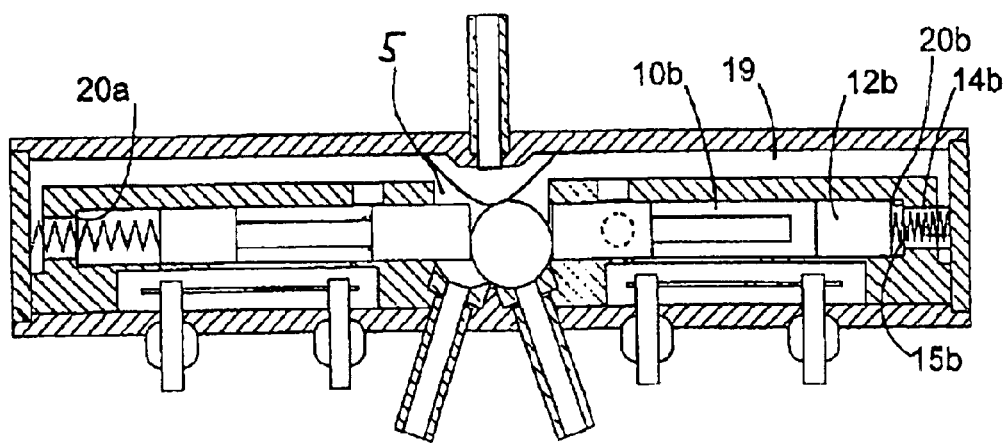

In the state shown in FIG. 1, the right-hand cylinder chamber 13b, which is filled with the same fluid that flows through the valve, is sealed off relative to the seat chamber 5 and its inlets and outlets. The piston 11b shuts off pressure compensation orifices 23b. When, in this state, the resistor 17b is supplied with energy from a current supply 100, the fluid in the heating chamber 16b heats up and the cylinder chamber 13b connected to it begins to expand. This leads in the first place, as shown in FIG. 2, to the displaceable rear wall 12b of the cylinder 10b moving back outward under the simultaneous compression of the helical spring 15b. The stroke of the backward movement may be substantially smaller than that illustrated in FIG. 2 and be virtually zero.

The fluid in this case displaced out of the spring chamber 14b reaches the seat chamber 5 via a duct 19 and is thus mixed with the fluid stream flowing through the valve.

Figure 3:
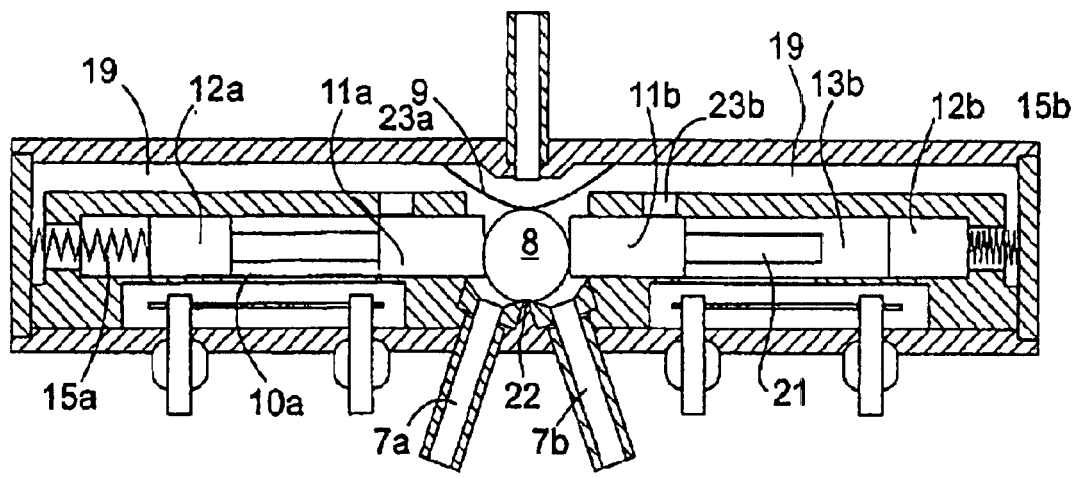

A shoulder 20b projecting from the wall of the spring chamber 14b on the inside forms a stop that immediately terminates the outward movement of the rear wall 12b. Finally, in the event of further heating and evaporation of the fluid in the cylinder chamber 13b, a state is reached where the internal pressure in the cylinder chamber 13b is sufficiently high to ensure that the plunger 11b displaces the ball 8 from the seat 7b counter to the force of the leaf spring 9. The ball 8 thus begins to move to the left, as shown in FIG. 3. In this case, it also displaces the plunger 11a and, via the latter, the displaceable rear wall 12a of the left-hand cylinder 10a and at the same time compresses its helical spring 15a. Finally, in this way, the unstable position of equilibrium shown in FIG. 3 is reached, in which the ball 8 is pressed centrally by the leaf spring 9 against a fin 22 between the two valve seats 7a, 7b. As soon as the fin 22 is overcome as a result of the further expansion of the heated fluid in the cylinder chamber 13b, the leaf spring 9 assists the further displacement of the ball 8 to the left and downward in the FIG. 4 onto the valve seat 7a. While this is taking place, the rear side of the plunger 12b passes the pressure compensation orifice 23b that connects the cylinder chamber 13b to the duct 19. The heated fluid escapes from the cylinder chamber 13b, and the inward movement of the plunger 11b driven by the fluid comes to a stop. At the same time, the compressed helical spring 15b can stretch again and push the displaceable rear wall 12b inward until the latter butts against the tip of the bar 21.

Figure 4:
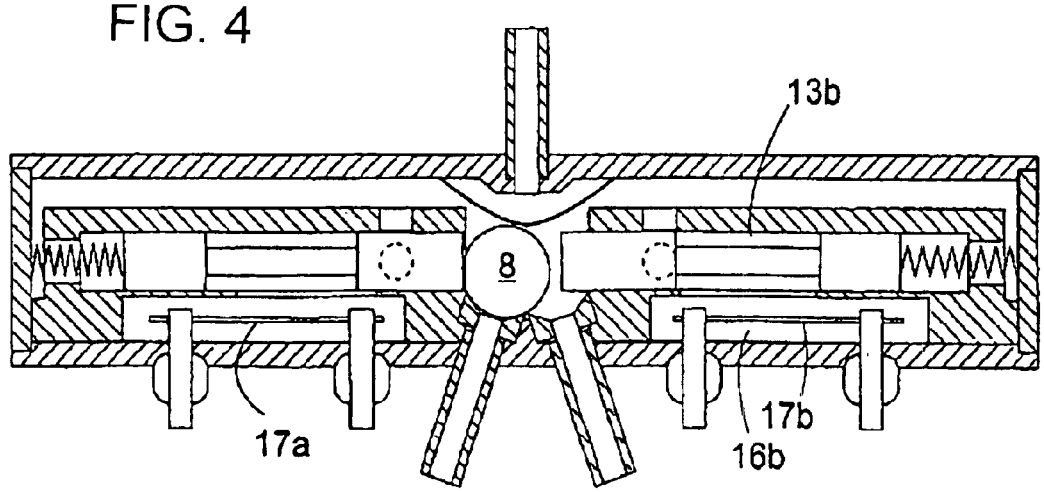

The configuration shown in FIG. 4 is thus established, which is a mirror image of the configuration of FIG. 1. The supply current to the resistor 17b is then interrupted, so that the heating chamber 16b and the cylinder chamber 13b can cool and the fluid density there again assumes the same value as in the other chambers 5, 13a, 16a of the valve.

When, at a later time, the resistor 17a is supplied with heating energy, the process proceeds mirror-symmetrically to that described above, and the ball 8 returns into the position of FIG. 1. The changeover operation functions, irrespective of whether fluid actually flows through the housing or whether this fluid stands in the latter. Only the force required for changing over the ball 8 can be higher in the case of a valve through which fluid flows than in the case without a flow, since the pressure of the fluid streams presses the ball 8 against its respective seat.

Figure 5:
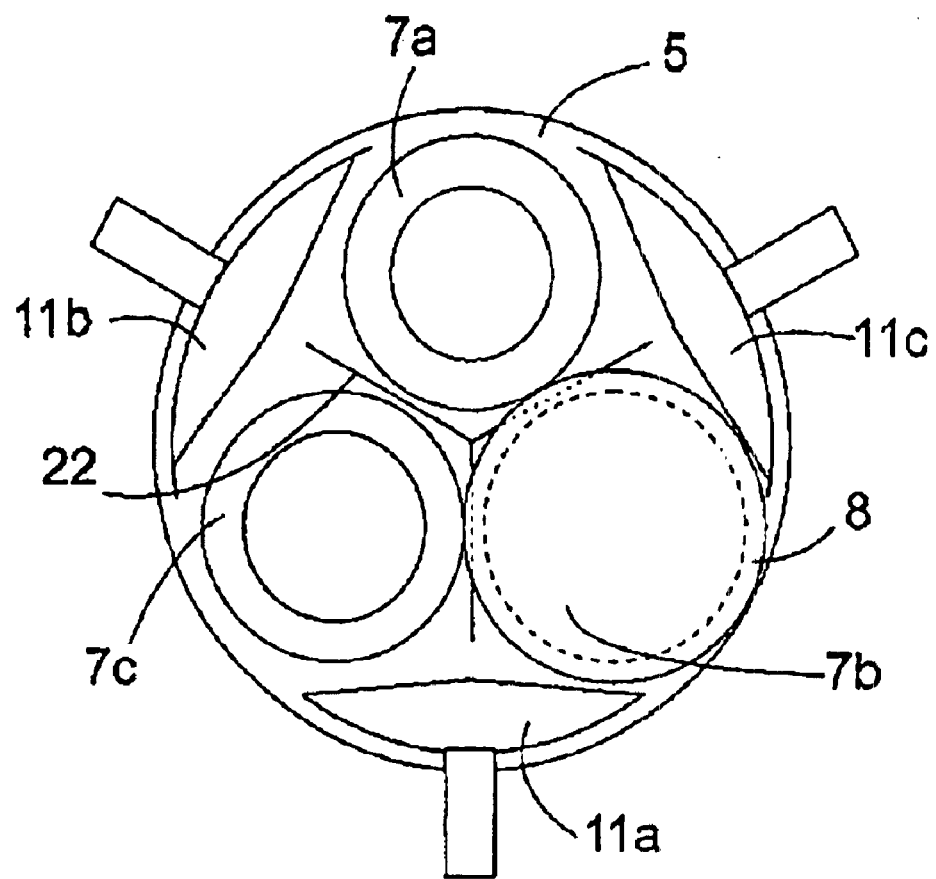
FIG. 5 is a diagrammatic, horizontal sectional view through the multiway valve according to a second embodiment of the invention.

The invention can also be applied to multiway valves having more than two outlets. FIG. 5 shows a diagrammatic sectional view through a seat chamber 5 where the sidewall of the seat chamber in which the valve seats, three seats 7a, 7b, 7c here, are disposed are shown in a top view. One of the valve seats, which is illustrated as a dashed circle 7b, is closed by the ball 8. Three plungers 11a, 11b, 11c, the cylinder chambers of which are constructed in the same way as shown in FIGS. 1 to 4 and are not illustrated in the FIG. 5, are disposed symmetrically in each case at an angular spacing of 120°. Each plunger 11a, 11b, 11c is symmetrically opposite two valve seats 7b, 7c; 7c, 7a and 7a, 7b. The width of each plunger, for example 11a, is sufficiently large to ensure that it can touch tangentially the ball 8, when the latter lies on one of the two seats 7b, 7c located in front of the plunger, and can push the ball in front of it, and, on the other hand, is sufficiently small to ensure that the plunger can be pushed forward inside the seat chamber 5 to an extent such that it overcomes the fin 22 between adjacent valve seats and, assisted by the leaf spring (not illustrated here), reaches the valve seat 7a located opposite the plunger 11a, without either plunger 11a touching the other two plungers 11b, 11c.

A multiway valve, as described above, can be used particularly in the refrigerant circuit of a refrigerator. In this case, the refrigerant that circulates in the circuit, for example isobutane, can be utilized as the working substance in the cylinder chambers 13a, 13b. The performance of the heating resistor 17a and 17b and of the heating current supply circuit assigned to them are sufficiently dimensioned, as a function of the other dimensioning of the refrigerant circuit, to ensure that the refrigerant can evaporate in the cylinder chambers 13a, 13b.

We claim:

1. A multiway valve, comprising:
   a housing having a plurality of inlets and outlets and a chamber formed therein;
   a plurality of valve seats each associated with one of said inlets or outlets;
   a closing member disposed in said housing and movable between said valve seats;
   at least one cylinder having a fluid-containing cylinder chamber formed therein and disposed in said housing;
   a heating device for heating said cylinder; and
   a plunger movable in said cylinder under pressure of a fluid, said plunger, by virtue of its movement, being capable of displacing said closing member from one of said valve seats to another of said valve seats.

2. The multiway valve according to claim 1, wherein during movement of said plunger, said cylinder chamber communicates temporarily with one of said inlets and outlets.

3. The multiway valve according to claim 1, wherein each of said valve seats is associated in each case to one of said outlets of the housings.

4. The multiway valve according to claim 1, further comprising a spring-elastic element for exerting on said closing member a counterforce which counteracts a displacement of said closing member from a respective one of said valve seats.

5. The multiway valve according to claim 4, wherein:
   said chamber of said housing has a sidewall; and
   said closing member is movable in said chamber of said housing;
   said valve seats are disposed on said sidewall of said chamber; and
   said spring-elastic element loads said closing member in a direction of said sidewall.

6. The multiway valve according to claim 4, wherein said spring-elastic element is a leaf spring.

7. The multiway valve according to claim 1, wherein:
   said closing member is movable in said chamber of said housing; and
   said cylinder has a pressure compensation orifice formed therein which, in an extended state of said plunger, allows pressure compensation between said chamber and said cylinder chamber of said cylinder.

8. The multiway valve according to claim 1, wherein said cylinder has a rear wall displaceable under spring load.

9. The multiway valve according to claim 8,
   wherein said cylinder has a spring chamber formed therein and delimited by said rear wall, said spring chamber communicating with said chamber; and
   further comprising a spring for loading said rear wall and accommodated in said spring chamber.

10. The multiway valve according to claim 1, wherein said plurality of valve seats are two valve seats and said cylinder is one of two cylinders disposed diametrically opposite one another in said housing.

11. The multiway valve according to claim 1, wherein:
    said housing has a heating chamber communicating with said cylinder chamber of said cylinder; and
    said heating device is disposed in said heating chamber.

12. A fluid circuit, comprising:
    a supply circuit supplying heating energy; and
    a multiway valve receiving a fluid in at least a partially liquid state, said multiway valve containing:
    a housing having a plurality of inlets and outlets and a chamber formed therein;
    a plurality of valve seats each associated with one of said inlets or outlets;
    a closing member disposed in said housing and movable between said valve seats;
    at least one cylinder having a fluid-containing cylinder chamber formed therein and disposed in said housing, said cylinder chamber receiving the fluid;
    a heating device associated with said cylinder for heating said cylinder, said heating device receiving the heating energy from said supply circuit for evaporating the fluid in said cylinder chamber of said cylinder; and
    a plunger movable in said cylinder under pressure of the fluid, said plunger, by virtue of its movement, being capable of displacing said closing member from one of said valve seats to another of said valve seats.

13. The fluid circuit according to claim 12, wherein the fluid is a refrigerant.

14. The fluid circuit according to claim 12, wherein the fluid is isobutane.

15. A refrigerator, comprising:
    a refrigerant circuit; and
    a multiway valve disposed in said refrigerant circuit, said multiway valve, containing:

a housing having a plurality of inlets and outlets and a chamber formed therein;

a plurality of valve seats each associated with one of said inlets or outlets;

a closing member disposed in said housing and movable between said valve seats;

at least one cylinder having a fluid-containing cylinder chamber formed therein and disposed in said housing;

a heating device associated with said cylinder for heating said cylinder; and a plunger movable in said cylinder under pressure of a fluid, said plunger, by virtue of its movement, being capable of displacing said closing member from one of said valve seats to another of said valve seats.

* * * * *